United States Patent [19]
Fahley et al.

[11] Patent Number: 6,047,459
[45] Date of Patent: Apr. 11, 2000

[54] METHOD FOR ASSEMBLY OF COMPONENTS FOR A VOICE COIL MOTOR

[75] Inventors: Terry R. Fahley, Lakeville; Paul L. Johnson, Bloomington; David L. Duvick, Eagan, all of Minn.

[73] Assignee: Seagate Technology, Inc., Scotts Valley, Calif.

[21] Appl. No.: 09/374,163

[22] Filed: Aug. 13, 1999

Related U.S. Application Data

[62] Division of application No. 09/108,946, Jul. 1, 1998.
[51] Int. Cl.$^7$ ....................................................... G11B 5/42
[52] U.S. Cl. ..................... 29/596; 29/603.03; 360/97.01; 360/98.07
[58] Field of Search .............................. 29/596, 598, 732, 29/603.03, 98.07, 99.04, 97.01

[56] References Cited

PUBLICATIONS

U.S. application No. 08/513,280, Fahley, filed Apr. 30, 1997, pending.
Assembly Device illustrated in FIGS AO–1 through AO–5 (prior to Jul. 1, 1998).

*Primary Examiner*—Carl E. Hall
*Attorney, Agent, or Firm*—Westman, Champlin & Kelly, P.A.

[57] ABSTRACT

A device for assembling a magnet assembly for a voice coil motor for a data storage device. The device including a base, spacer nests and first and second assembly blocks for supporting plates for assembly of the magnet assembly. The first and second assembly blocks including nest bases having an x-y axis and including x-y datum members. The plates are biased toward x-y datum members via clamps operably coupled to the nest base. Retainer members are operably coupled to the assembly blocks and aligned relative to the nest base to retain plate relative to nest base for assembly. The assembly blocks are movably coupled to the base to operate between a retracted position and an advanced assembly position. In the advanced assembly position, the first and second assembly blocks being aligned with the spacer nest supporting spacers for assembling the magnet assembly.

4 Claims, 12 Drawing Sheets

METHOD FOR ASSEMBLY OF COMPONENTS FOR A VOICE COIL MOTOR

This application is a division of Ser. No. 07/108,946, filed Jul. 1, 1998.

FIELD OF THE INVENTION

The present invention relates to an assembly device for a data storage system. In particular, the present invention relates to an assembly device for assembling components of a voice coil motor coupled to an actuator block supporting heads.

BACKGROUND OF THE INVENTION

A disc drive includes a plurality of stacked discs which are rotationally supported relative to a disc spindle and an actuator assembly movably supporting a plurality of head gimbal assemblies for reading and writing data to the discs. The actuator assembly includes an actuator drive typically a voice coil motor for actuating the head gimbal assemblies relative to selected data tracks of the discs.

The voice coil motor includes a magnet assembly defining a permanent magnetic field and a energizable coil coupled to an actuator block supporting the head gimbal assemblies. A voltage is supplied to the coil to selectively operate and move the actuator block to align the head gimbal assemblies relative to predetermined data tracks of the discs.

A typical magnet assembly includes upper and lower pole plates or backirons which are supported relative to the disc drive assembly in a spaced relation and include a magnet coupled thereto to define a flux gap therebetween. An energized coil moves in the flux gap between the upper and lower pole plates.

For proper operation of the voice coil motor, the magnets must be accurately aligned and assembled to upper and lower pole plates; and upper and lower pole plates should be accurately aligned and connected for accurate head placement relative to selected data tracks. The magnet components should be assembled to limit the release of magnetic debris which may contaminate the disc drive and interfere with read/write operations of the disc drive.

The present invention addresses these and other problems, and offers advantages over the prior art.

SUMMARY OF THE INVENTION

The present invention relates to a device for assembling a magnet assembly for a voice coil motor for a data storage device. The device includes a base, spacer nests and first and second assembly blocks for supporting plates for assembly of the magnet assembly. The first and second assembly blocks include nest bases having an x-y axis and including x-y datum members. The plates are biased toward x-y datum members via clamps operably coupled to the nest base. Retainer members are operably coupled to the assembly blocks and aligned relative to the nest base to retain plates relative to the nest base for assembly. The assembly blocks are movably coupled to the base to operate between a retracted position and an advanced assembly position. In the advanced assembly position, the first and second assembly blocks are aligned with a spacer supported in the spacer nest for assembling components of the magnet assembly.

DETAILED DESCRIPTION OF THE PREFERRED EMBODIMENTS

Figure 1:
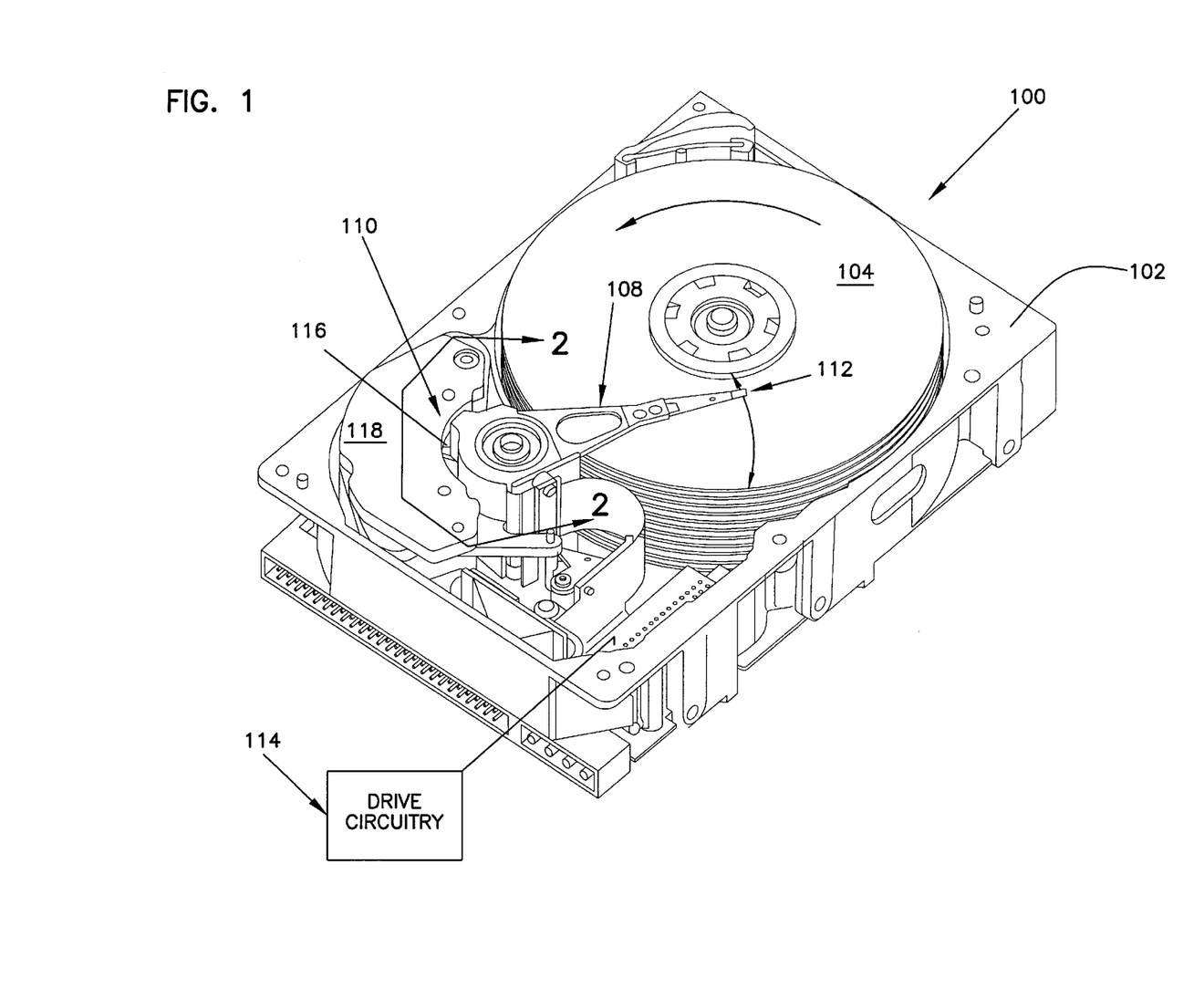
FIG. 1 is a perspective view of a data storage system.

The present invention relates to a system and apparatus for assembling components of a voice coil motor for a data storage device as illustrated in FIG. 1. As shown, the data storage device 100 includes a base 102, a disc stack 104, an actuator block 108, and a voice coil motor (VCM) 110. The actuator block supports heads 112 (only one is shown in FIG. 1) relative to the disc stack 104. The voice motor 110 is operably coupled to the actuator block for movement of the actuator block 108 along an arcuate path to position head 112 supported thereby relative to selected data tracks. Operation of the voice coil motor 110 and head 112 is coupled to circuitry 114 of the disc drive.

Figure 2:
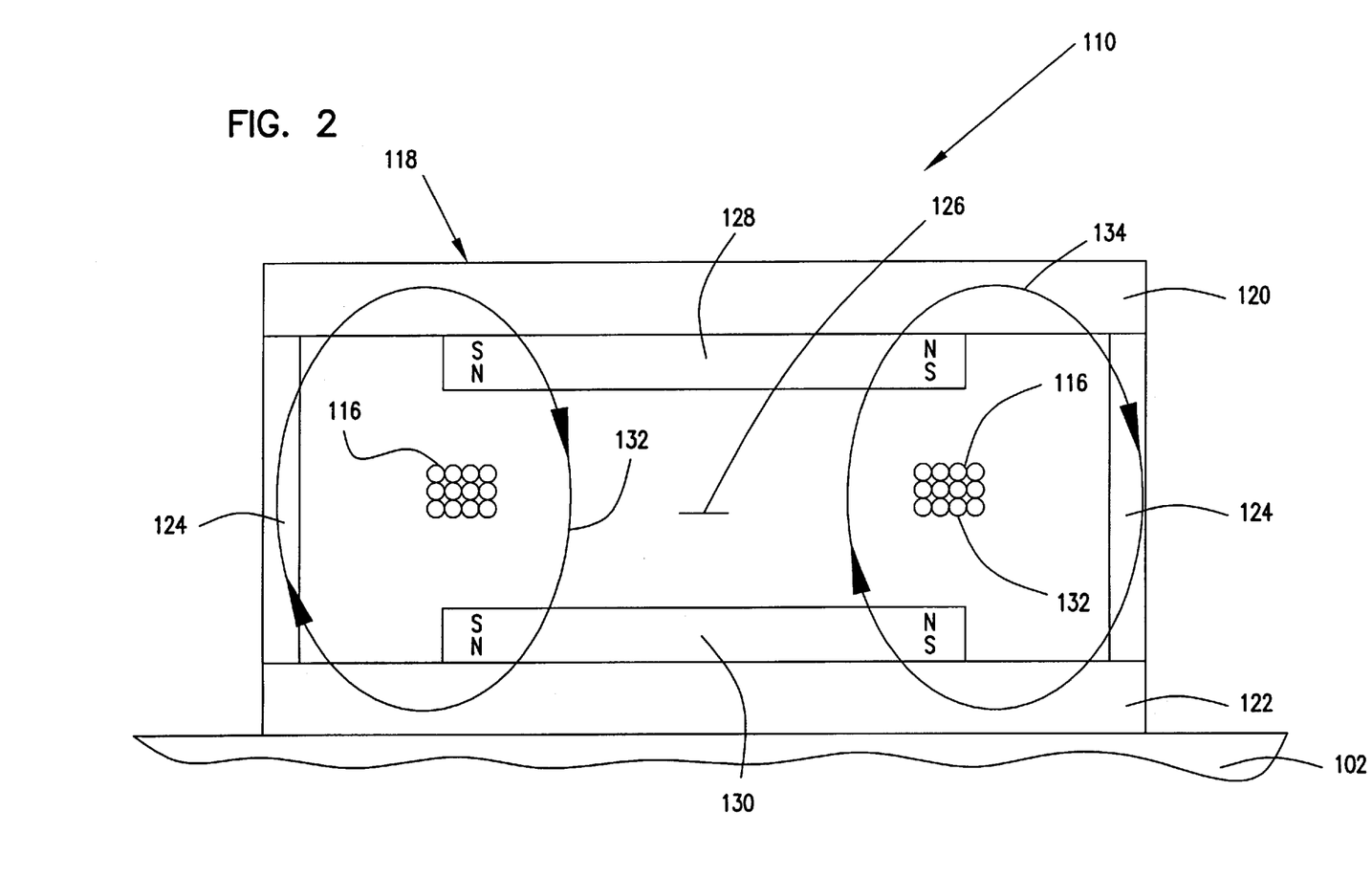
FIG. 2 is a cross-sectional view of a magnet assembly of a voice coil motor taken generally along lines 2—2 of FIG. 1.

FIG. 2 is a sectional view taken along lines 2—2 disc drive of FIG. 1 illustrating the VCM 110. The voice coil motor 110 includes an energizable coil 116 coupled to actuator block 108 and a magnet assembly 118 coupled to base 102 of the disc drive. In the embodiment shown, the magnet assembly 118 includes a plurality of pole plates 120, 122. Plates 120, 122 are supported in spaced relation via spacers 124 to form gap 126 therebetween. In the embodiment shown, magnets 128, 130 are supported by plates 120, 122 to form a permanent magnetic field in gap 126. In the embodiment shown, plates 120, 122 support bi-polar magnets 128, 130 to form bi-directional flux paths 132, 134 for operation of the voice coil motor. Coil 116 extends into the gap 126 in alignment with flux paths 132, 134 for generating a rotating force for operating actuator block 108 proportional to current flowing through the coil 116.

For desired operation, it is important to accurately align magnets 128, 130 and plates 120, 122 to correspond to the alignment of the coil so that coil portions are properly oriented relative to flux paths 132, 134 for rotating the actuator block 108 by energizing the coil 116. Although a particular magnet assembly is shown, it should be understood that the invention is not limited to the particular embodiment shown.

Figure 3:
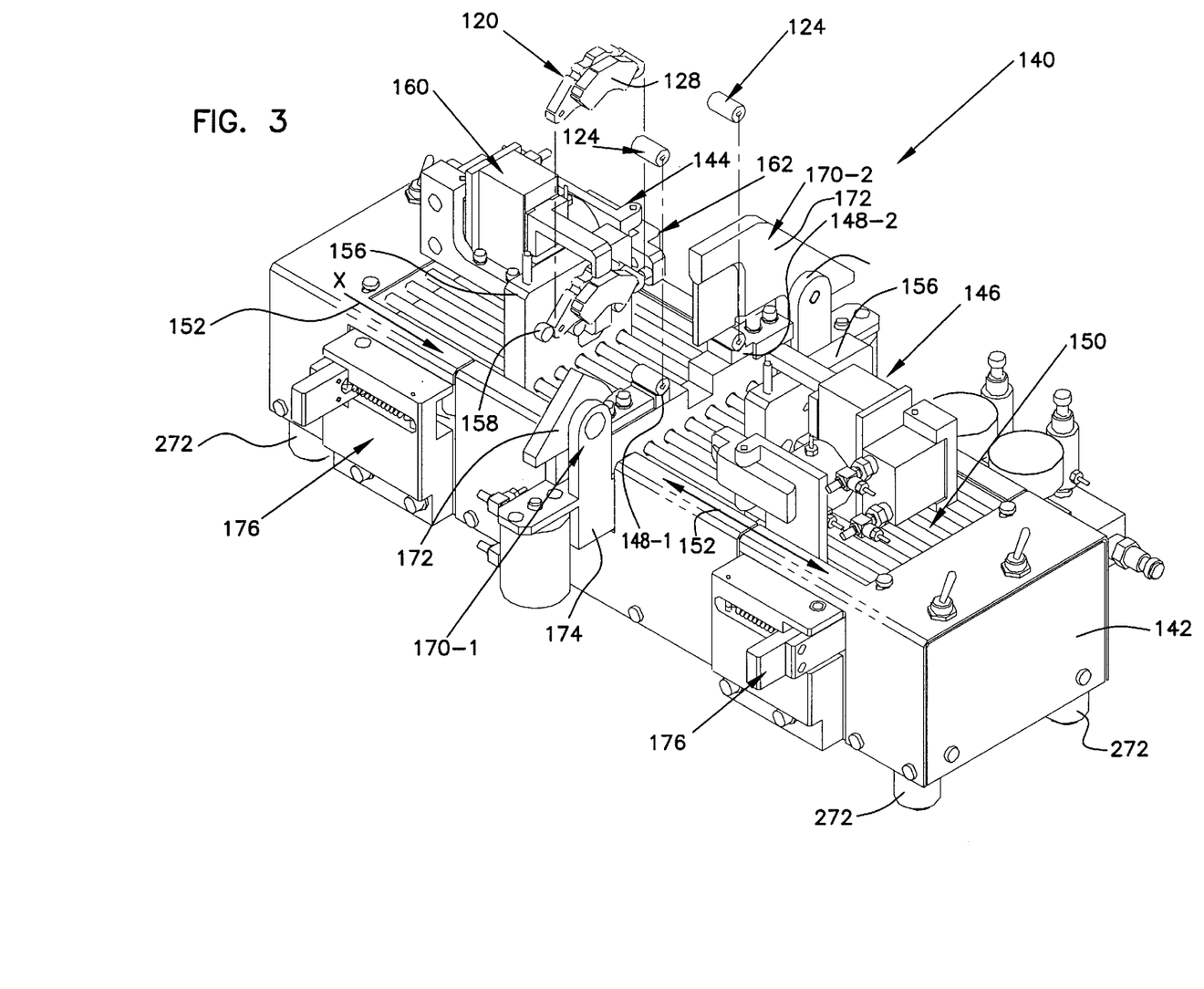
FIG. 3 is a perspective view of an embodiment of a device of the present invention for constructing magnet assemblies.

FIG. 3 illustrates an embodiment of an apparatus 140 of the present invention for assembling magnet assemblies 118. As shown, the apparatus 140 includes a frame 142, a first assembly block 144, a second assembly block 146 and spacer nests 148-1, 148-2. Plates 120, 122 are supported via assembly blocks 144, 146 respectively and spacers 124 are supported via spacer nests 148-1, 148-2. Spacer nests 148-1, 148-2 are supported via frame 142 between assembly blocks 144, 146 to align assembly blocks 144, 146 with opposed ends of spacers 124 supported by spacer nests 148-1, 148-2 for assembly of plates 120, 122 and spacers 124. Assembly blocks 144, 146 are movably supported relative to frame 142 along a plurality of grill rods 150 as illustrated by arrows 152. Assembly blocks 144, 146 operate between a retracted position shown for loading plates 120, 122 onto blocks 144, 146 and an advanced assembly position where plates 120, 122 contact opposed ends of spacers 124 supported by spacer nests 148-1, 148-2 to assemble the magnet assembly 118 as will be explained.

Assembly blocks 144, 146 include a nest base 156 and a plurality of fixed pins 158 extending generally perpendicular to nest base 156. Nest base 156 and pins 158 cooperatively form a nest for supporting plates 120, 122 for assembly. Plates 120 122 are retained and aligned in the nest via clamp assemblies 160 and 162 which operate between a retracted position and a clamping position as will be explained.

Spacers 124 are retained in nests 148-1 and 148-2 via spacer clamps 170-1 and 170-2. Clamps 170-1, 170-2 include a rotatable clamp arm 172 rotationally supported via bracket 174 coupled to frame 142. Clamp arm 172 rotates between an opened position and a closed gripping position to clamp spacers 124 for assembly. Thus, to assemble the magnet assembly 118, plates 120, 122 are loaded in nests and spacers 124 are loaded in nests 148-1 and 148-2 and secured. While plates 120, 122 are loaded into nests, blocks 144, 146 are maintained in the retracted position as shown in FIG. 3 spaced from spacers 124 via latch assembly 176. To assembly plates 120, 122, latch assembly 176 is released and blocks 144, 146 are advanced as illustrated to align plates 120, 124 with spacers 124 in nests 148-1, 148-2. Thereafter spacers 124 are secured to plates 120, 122 to form the magnet assembly 118.

Figure 4:
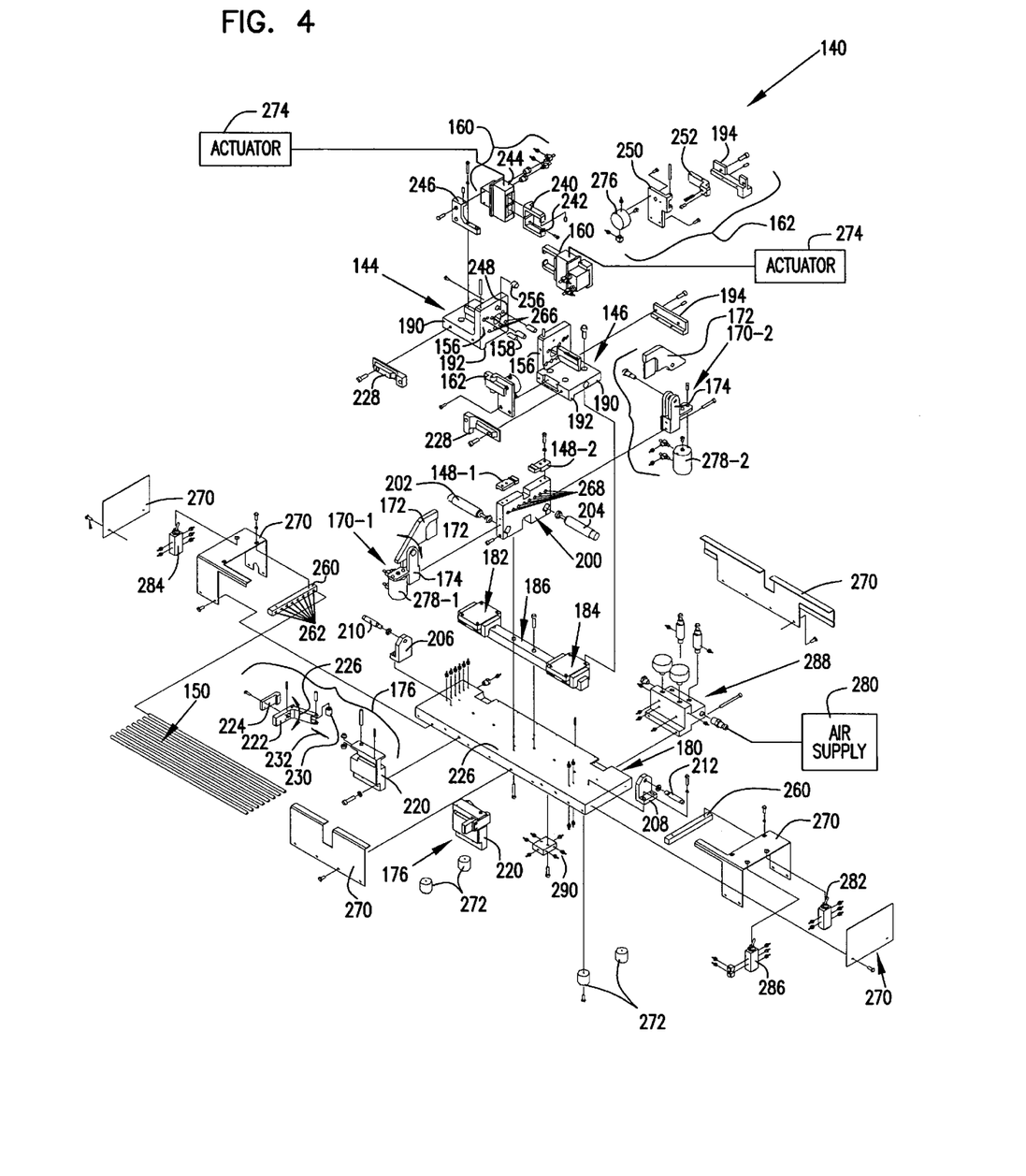
FIG. 4 is an exploded view of the components of the device illustrated in FIG. 3.

FIG. 4 is an exploded view of the components of device 140. As shown in FIG. 4, frame 142 includes base 180. Assembly blocks 144, 146 are movably supported relative to base 180 via spaced slides 182, 184 movable along a track 186 coupled to base 180. Blocks 144, 146 include a slide base 190 which is coupled to slides 182, 184. Slide bases 190 include spaced rails 192, 194 which extend downwardly from block base 190. Rails 192, 194 are spaced to extend over slide bases 182, 184 to laterally secure and align blocks 144, 146 relative to slides 182, 184 and track 186 for precision alignment of plates 120, 122. Rail 192 is integrally formed with slide base 190 and rail 194 is formed of a member which is separately attached to base 190 to align and fix blocks 144, 146 to slide bases 182, 184 to move along track 186 between the retracted position and the assembly position.

Spacer nests 148-1, 148-2 are supported by block 200 secured to base 180. Block 200 supports shock absorbers 202, 204 in alignment with blocks 144, 146. to gradually limit motion of the blocks 144, 146. Blocks 144, 146 contact shock absorbers 202, 204 to define the assembly position. Blocks 206, 208 are coupled to base 180 and support shock absorbers 210, 212 to define a retracted position for blocks 144, 146. Thus, the travel stroke for blocks 144, 146 is defined between shock absorbers 210, 202 and 212, 204, respectively.

As previously explained, blocks 144, 146 are supported in the retracted position via latch assembly 176. Latch assembly 176 includes a support block 220 coupled to base 180. Support block 220 rotationally supports a latch arm 222 and push arm 224 as illustrated by arrow 226 to rotate between a latched position and a released position. The latch assembly 176 also includes latch blocks 228 coupled to blocks 144, 146. Latch arm 222 is operably coupled to latch block 228 in the latched position via roller 230 on latch arm 222 to restrict movement of blocks 144, 146 to maintain blocks 144, 146 in the retracted position as will be explained. Push arm 224 rotates in combination with latch arm 222 and cooperates with stop block 228 for initiating movement of blocks 144, 146 for operation as will be explained. Latch arm 222 is spring biased via spring 232 in the latched position.

As previously explained, clamp assemblies 160, 162 are coupled to nest base 156. Clamp assembly 160 includes opposed actuated arms 240, 242 and clamp base 244. Clamp bases 244 are coupled to block 144, 146 via clamp platform 246 coupled to slide base 190. Actuated arms 240, 242 are movably supported via clamp base 244 between a spaced opened position and a clamping position. Arm 240 extend above nest base 156 and arm 242 extends through opening 248 in nest base 156 to align arms 240, 242 relative to a plate 120, 122 supported by nest base 156. Clamp assembly 162 includes a plate 250 coupled to a side of block 144, 146 and a clamp arm 252 rotationally coupled to plate 250 to operate between an opened position and a clamped position. Nest base 156 includes a magnet 256 supported thereby for retaining a plate 120, 122 relative to nest base 156.

Plates 120, 124 are supported by nest base 156 a distance above track 186. Track 186 is formed of a steel material for precision operation. Grill rails 150 separate plates 120, 122 supported by nest bases 156 from track 186 and are spaced to provide a barrier to limit transfer of contamination from magnets to track 186. Contamination collected by the magnetically attractive steel track 186 may be transferred to magnet assemblies 118 and may corrupt data in the data storage system into which the magnet assembly 118 is assembled. Grill rails 150 are supported at opposed ends via rail blocks 260 including a plurality of rail holes 262. Rail blocks 260 are coupled to frame 142. Rails 150 extend through holes 262 of rail blocks 260 and through holes 266 of blocks 144, 146. Rails 150 are supported at an intermediate extent via block 200 and extend through holes 268 through block 200. Cover portions 270 are coupled to base 180 to form frame 142. Feet 272 are coupled to base 180 to support device 140.

The clamp assemblies 160, 162 are operated between an opened or retracted position and clamping position via pneumatic actuators 274 and 276. Spacer clamps 170-1, 170-2 are operated via pneumatic actuator 278-1, 278-2 between an opened position and a clamping position. Actuators 274, 276 and 278 are coupled to an air supply 280. Toggle valves 282, 284, 286 are coupled to air supply 280 to control operation of actuators 274, 276, 278. Regulator assembly 288 controls air pressure from air supply 280 to toggle valves 282, 284 and 286. Each actuator block 144, 146 includes clamp assemblies 160, 162. Toggle valves 282, 284 are coupled to both actuators 274, 276 for each actuator block 144, 146, respectively to simultaneously operate both clamp assemblies 160, 162 for each actuator block 144, 146 respectively. Toggle valve 286 is coupled to air supply 280 to control operation of spacer clamps 170-1, 170-2. Manifold 290 is coupled to toggle valve 286 to supply equal pressure to actuators 278-1, 278-2 for concurrent operation of spacer clamps 170-1, 170-2.

Figure 5:
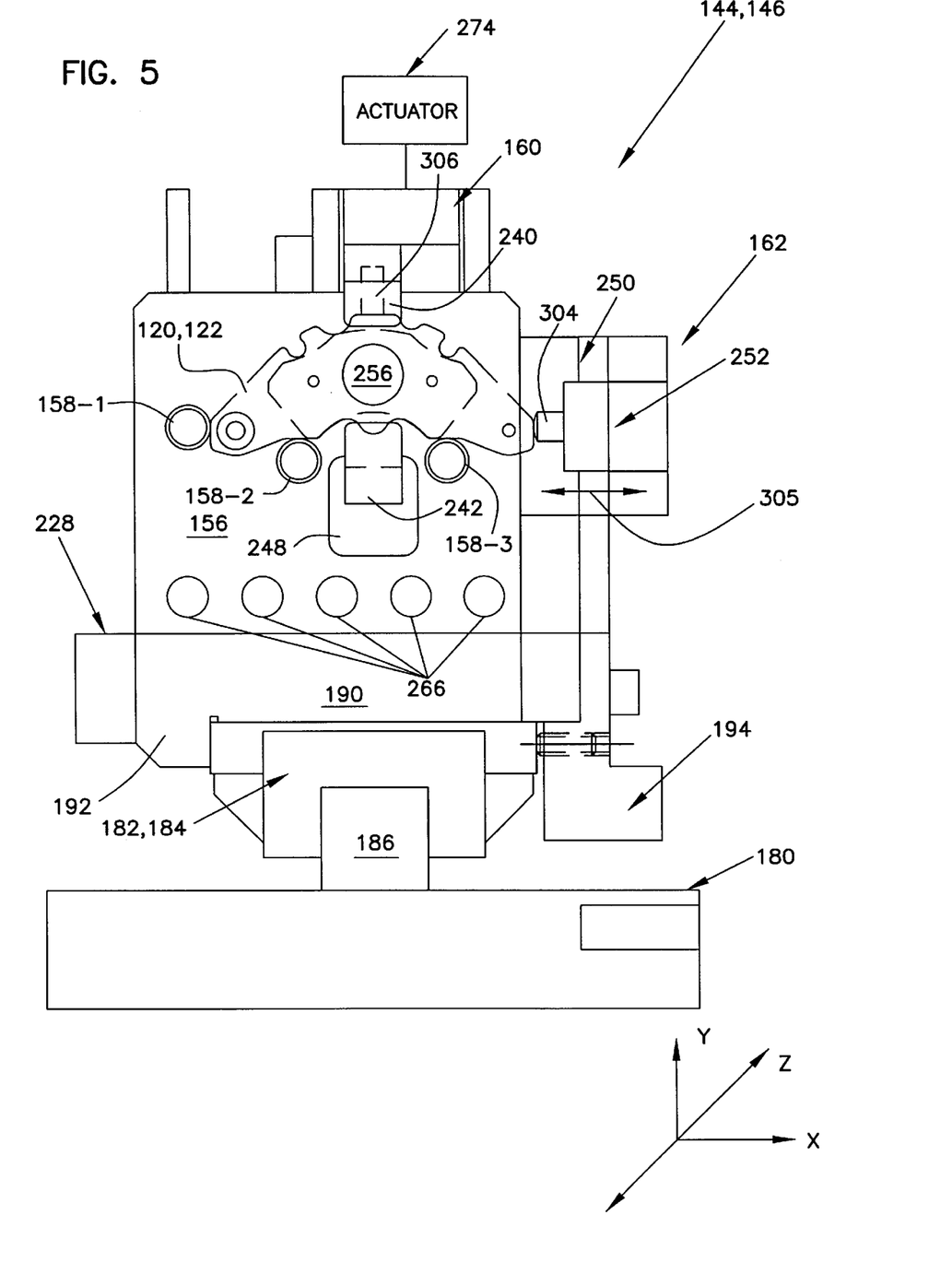
FIG. 5 is an elevational view of a plate nest movable along a track coupled to the base.
Figure 6:
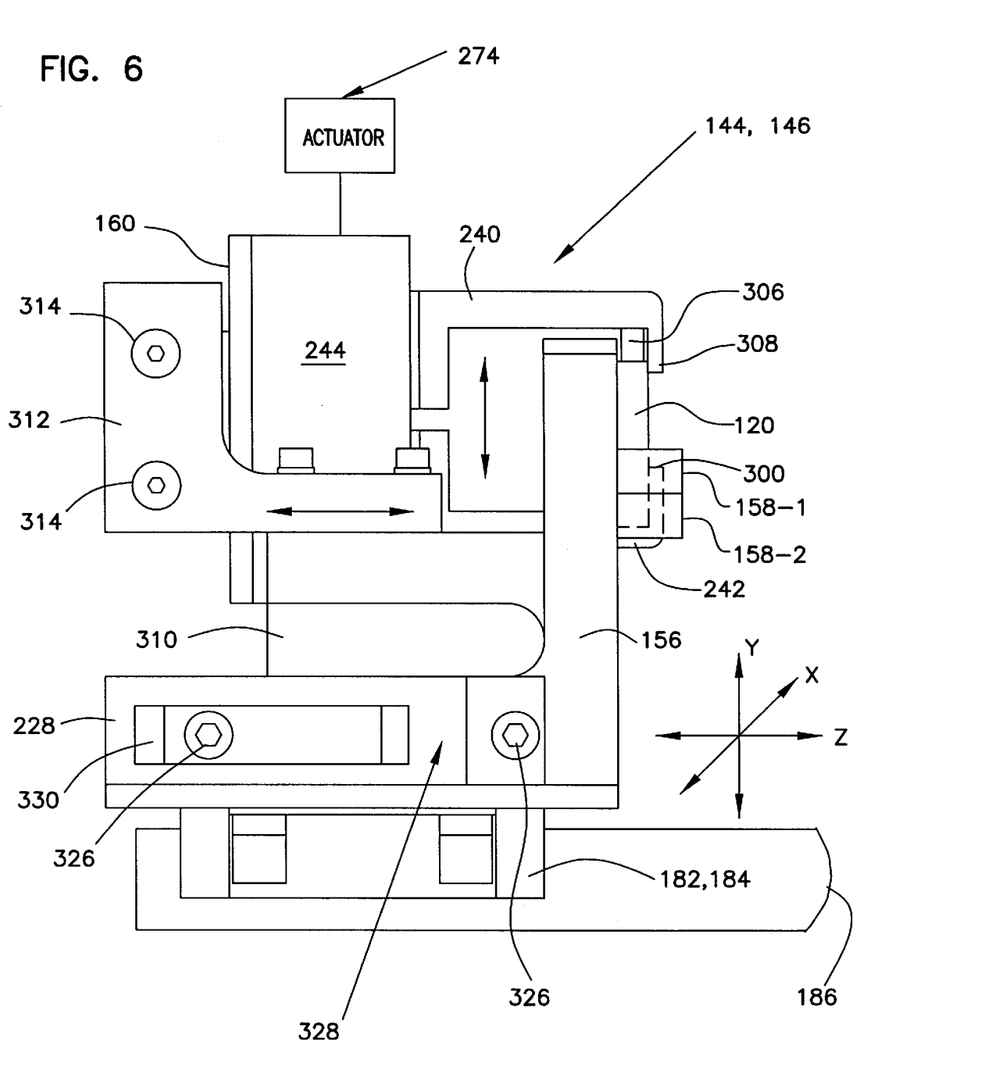
FIG. 6 is a side elevational view of the plate nest illustrated in FIG. 5.

FIG. 5–6 are detailed illustrations of assembly blocks 144, 146 coupled to slides 182, 184 movable along track 186. As shown, nest base 156, of assembly blocks 144, 146 extends perpendicular to slide base 190 to support plates 120, 122 in vertical alignment relative to base 180 and track 186. Pins 158-1, 158-2, 158-3 extend from base 156 for x-y alignment of plates 120, 122 for precision assembly of the magnet assembly 118. Pin 158-3 provides an x-axis datum and pins 158-2, 158-3 define y-axis datum. Plates are loaded in nest and located relative to datum pins.

As shown in FIG. 5, clamp arm 252 of clamp assembly 162 movably supports pin 304 between a retracted position and clamped position as illustrated in arrow 305 to define an x-axis alignment clamp. Pin 304 is movably supported via clamp arm 252 between retracted position and a clamped position. In the clamped position shown in FIG. 5, pin 304 engages plate 120, 122 to bias plate toward x-axis datum pin 158-1 for providing x-axis alignment for plates 120, 122 in nests of blocks 144, 146.

Arms 240, 242 of clamp assembly 160 are formed of "L" shaped members defining an elongated longitudinal extent generally perpendicular to the nest base 156 and a vertical extent perpendicular to the longitudinal extent and parallel to nest base 156. In the embodiment shown, upper arm 240 includes a y-axis pin 306 extending downwardly from longitudinal extent aligned to engage plates 120, 122 supported in nest and bias plates 120, 122 toward or against y-axis datum pins 158-2, 158-3 to define a y-axis alignment clamp for biasing plates 120, 122 toward datum pins 158-2, 158-3 for y-axis alignment of plates. Datum pins 158 are located in the same position on nest bases 156 of assembly blocks 144, 146 which are assembled on slides 182, 184 movable along a single track 186 for uniform alignment of plates 120, 122 supported by blocks 144, 146 with spacers 124. Since slides 182, 184 are operable along a single track 186, as opposed to multiple independent tracks, slides 182, 184 do not need to be pre-aligned for operation to assure proper alignment of assembly blocks 144, 146 supported thereby.

Figure 7:
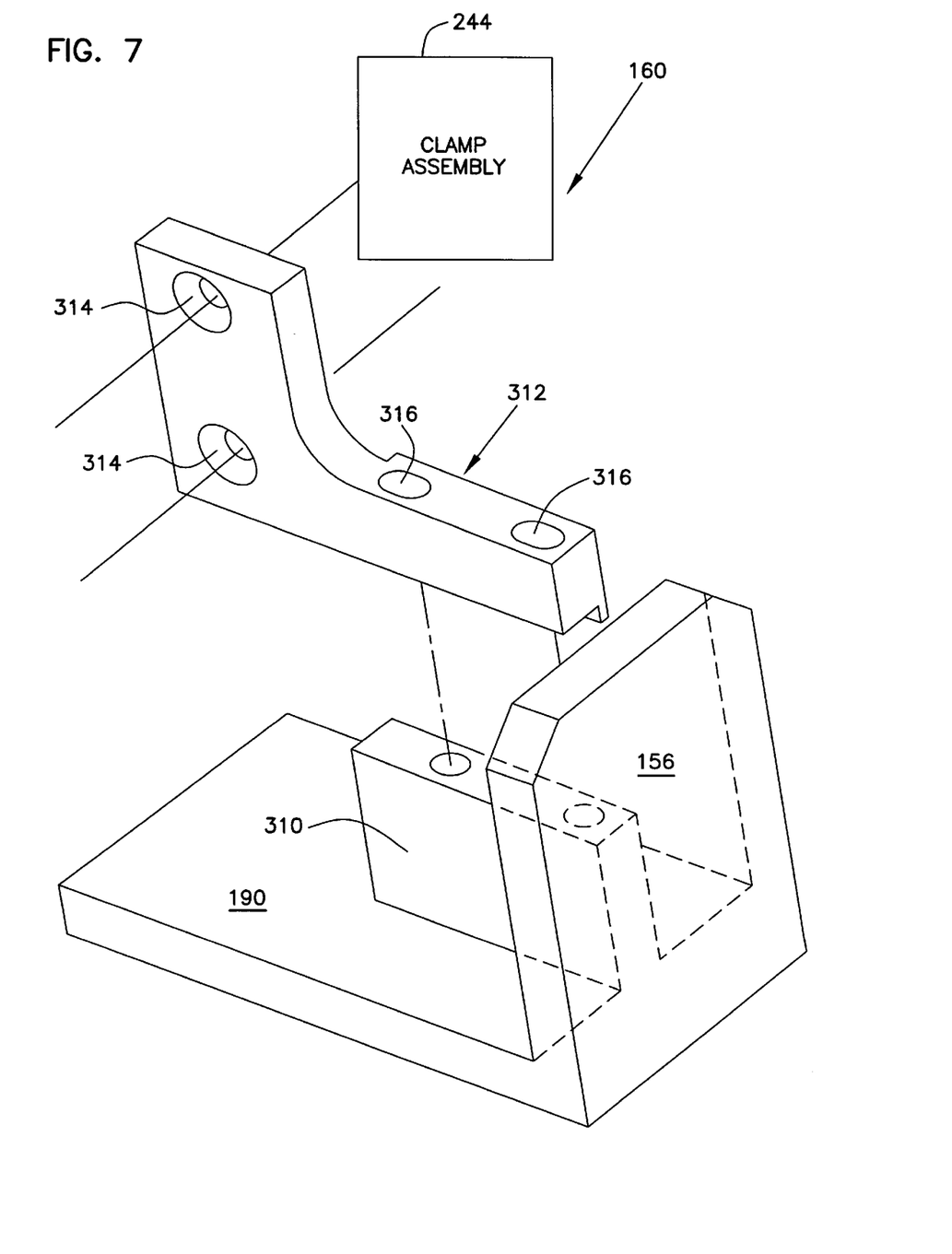
FIG. 7 is an exploded view illustrating construction of a support for a clamp assembly coupled to plate nest.

As illustrated in FIGS. 6–7, clamp base 244 is adjustable coupled relative to assembly blocks 144, 146 via block post 310 and plate 312. As shown, block post 310 is formed of a relatively thin member having a dimension sized to fit through gaps between grill rods 150. Clamp base 244 is secured to plate 312 via fastener holes 314. Plate 312 is coupled to block post 310 via elongated slotted holes 316 on plate 312 as shown in FIG. 7. The elongated slotted holes 316 allow plate 312 to be adjustably secured to block post 310 for locating the retaining member and alignment clamp of clamp assembly 160 to align with the elevated surface of plates 120, 122 for maintaining the plates 120, 122 in nest for assembly. Thus, plate 312 may be adjustably secured to block post 310 to locate retaining member depending upon the height or dimensions of the plate 120, 122 to abut against plates 120, 122 to retain plates in nest for operation. Although a particular embodiment of an x-y clamp and retaining member are illustrated, it should be understood that the invention is not limited to the particular embodiment shown. Although retaining member is shown vertically aligned, the invention is not limited to any particular alignment for retaining member. Preferably, clamp base 244 and clamp arms 240, 242 are constructed of COMPACT GRIPPERS available from Compact Air Products, Inc. of Westminster, S.C.

Figure 8:
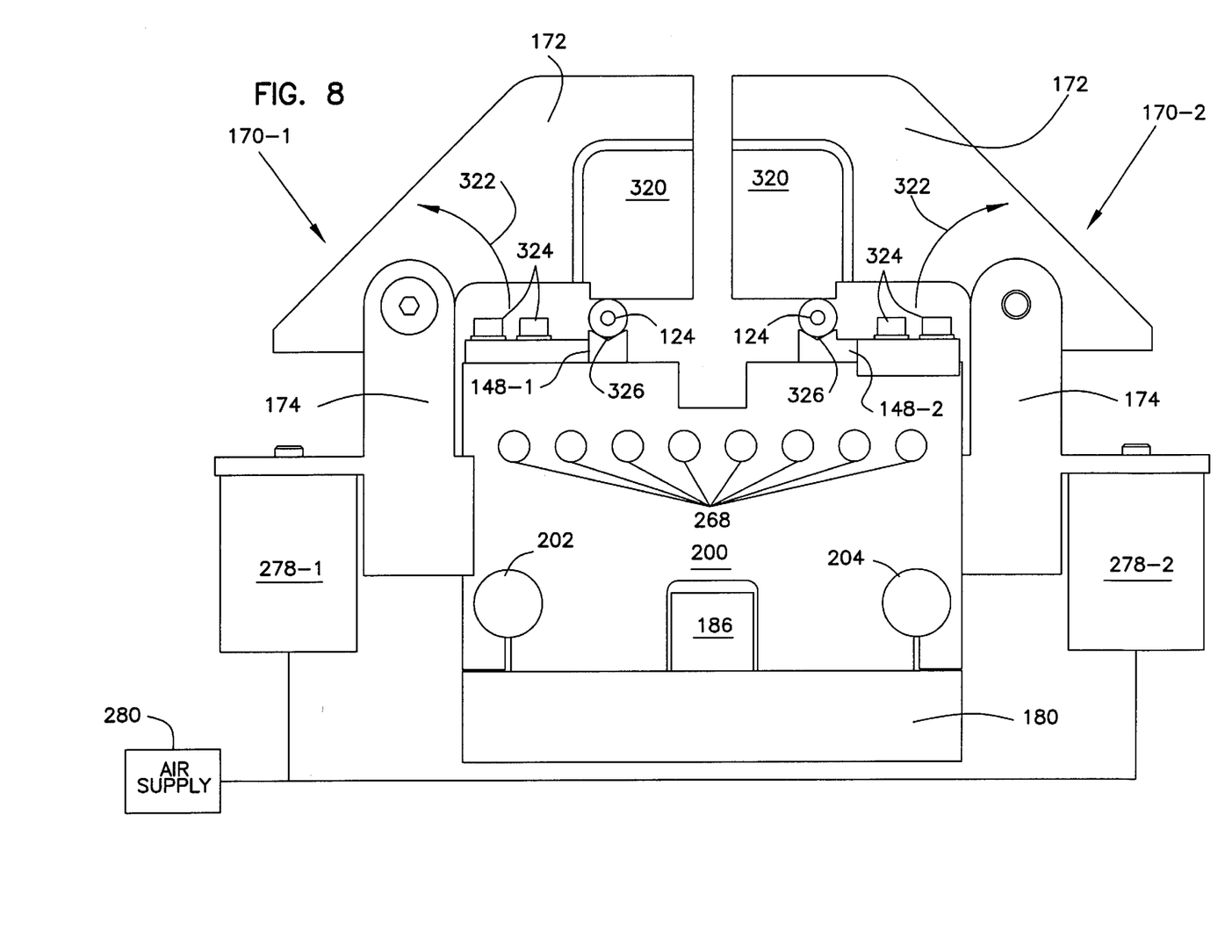
FIG. 8 is an elevational view of an embodiment of spacer nests for supporting spacers for assembly and clamps for retaining spacers in nests.
Figure 9:
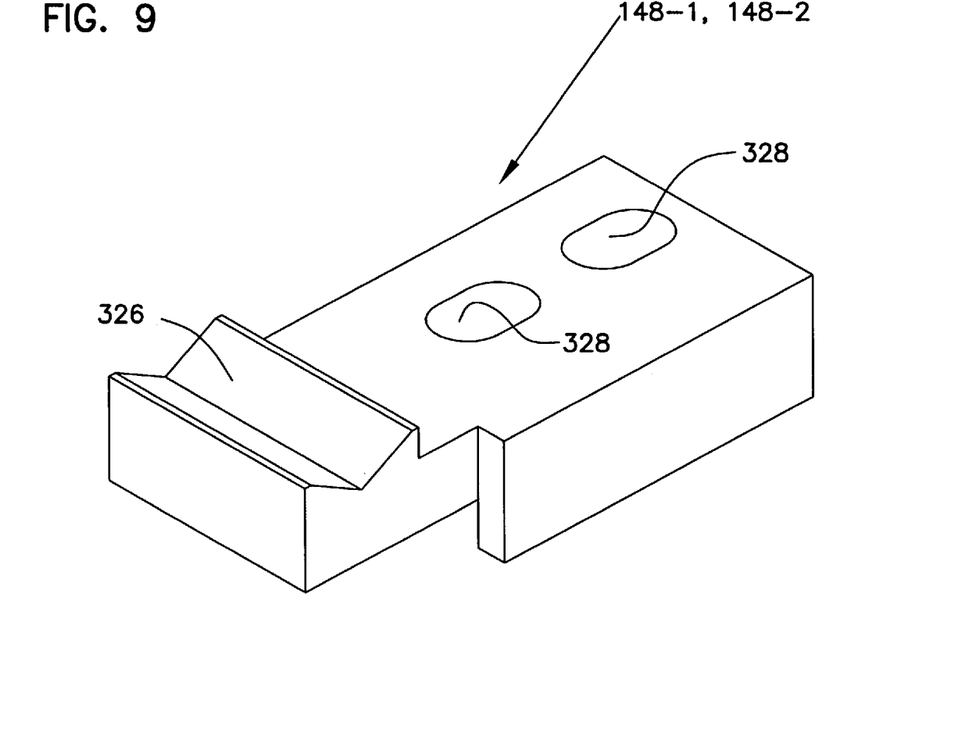
FIG. 9 is a perspective view of a spacer nest for supporting spacers for assembly.

FIG. 8 is a detailed view of the spacer nest 148-1, 148-2 and spacer clamps 170-1, 170-2. Clamp arms 172 support a clamp 320 formed of a relatively rigid material which is biased relative to spacers 124 supported in nests 148-1, 148-2 via pneumatic actuators 278-1, 278-2. FIG. 8 illustrates clamps 320 in an engaged position. Arms 172 rotate as illustrated by arrow 322 to release spacers 124 after assembly. Nest block 148-1, 148-2 are coupled to block 200 via fasteners 324 and include a "V" shaped trough 326 as illustrated in FIGS. 8–9 for supporting elongated spacers 124. As shown, in FIG. 9, blocks 148-1, 148-2 are coupled to block 200 via slotted holes 328 for adjusting the attachment position of block 148-1, 148-2 for alignment with supported plates 120, 122. Once the correct attachment position is determined, fasteners 324 (shown in FIG. 8) are tightened to secure nests 148-1, 148-2 to block 200.

Figure 10:
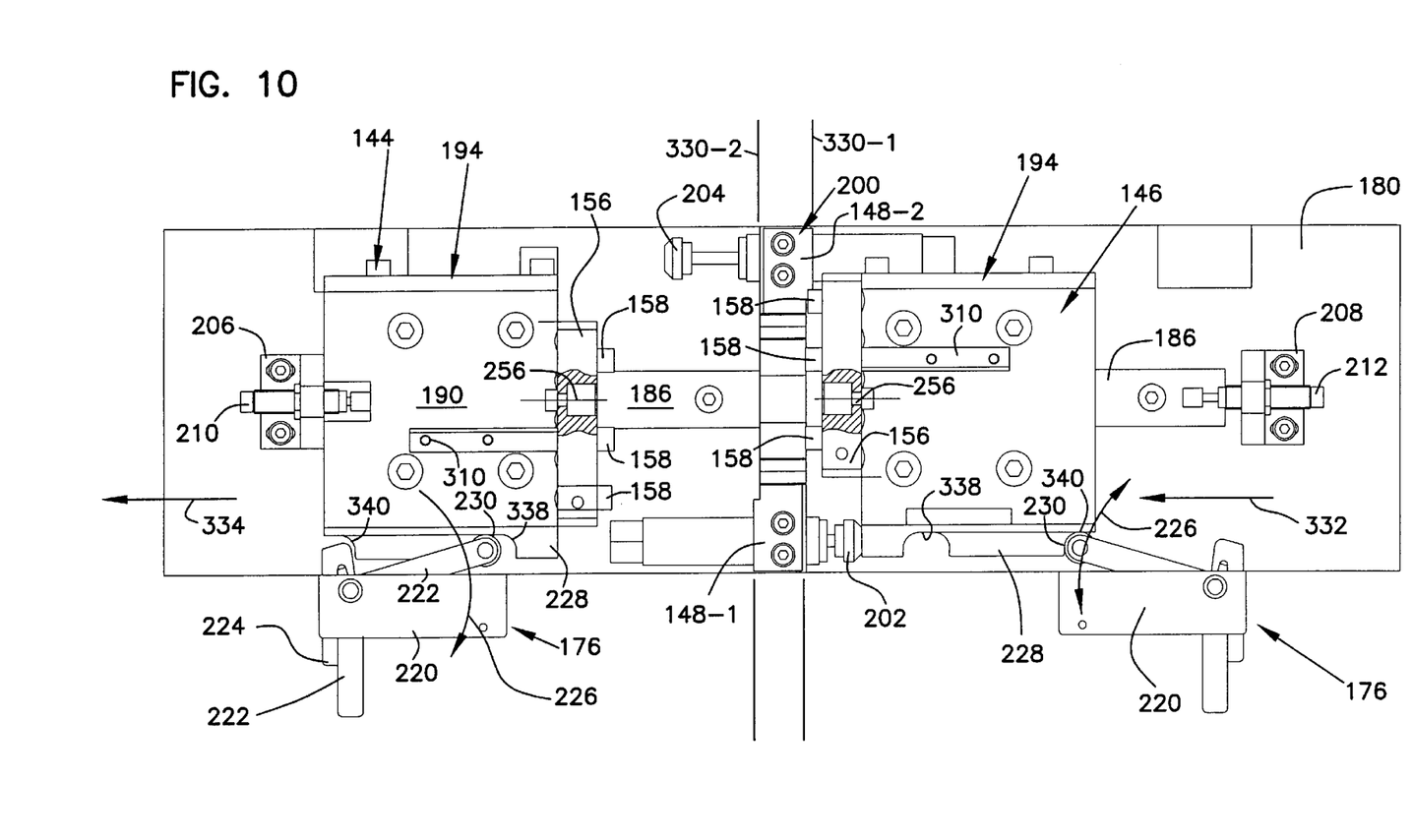
FIG. 10 is a top plan view of the embodiment of the device illustrated in FIG. 3 illustrating operation of assembly blocks along the track coupled to the base for assembly of plates to spacers.

FIG. 10 is a top plan view illustrating operation of assembly blocks 144, 146 along track 186 without clamp assemblies 160, 162 attached for simplicity. Block 200 supporting spacer nests 148-1, 148-2 is coupled to a center of base 180 over track 186. Assembly blocks are coupled to slides 182, 182 on opposed sides of block 200. As shown, assembly block 144 is in a retracted position and assembly block 146 is in an advanced assembly position aligned with an assembly datum 330-1. To load plates 120, 122, both assembly blocks 144, 146 are positioned in the retracted position. The retracted positioned is defined via cooperation of shock absorber 210 or 212 contacting a rearward surface of block base 190. After plates 120, 122 are loaded, assembly blocks 144, 146 are moved to the advanced position as illustrated by arrow 332 to align plates (not shown) relative to assembly datums 330-1, 330-2 aligned with ends of spacers 124 supported via nests 148-1, 148-2. Advancement of the blocks 144, 146 is restricted by contact of blocks 144, 146 with shock absorbers 202, 204 to define the advanced assembly position of blocks 144, 146. In the advanced position, spacers 124 are secured to plates 120, 122 to construct magnet assemblies 118. After assembly, blocks 144, 146 are retracted to the load position as illustrated by arrow 334.

Figure 11:
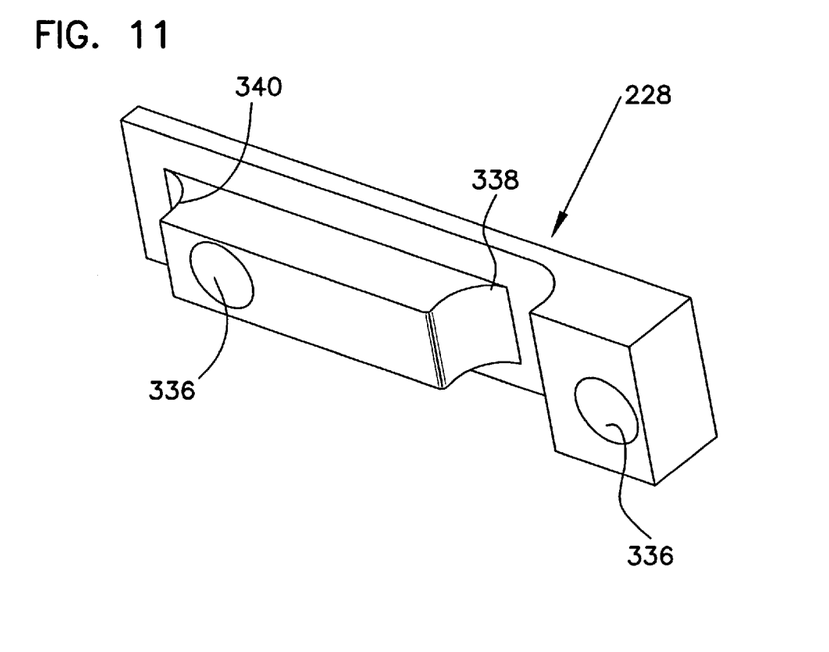
FIG. 11 is a perspective view of latch block secured to assembly blocks and including detent holes for operation of a latch assembly coupled to the assembly blocks.

The blocks 144, 146 are maintained in a retracted position via latch arm 222 of latch assembly 176. As shown, latch arm 222 is rotationally coupled to block 220 on base 180. Latch block 228 as illustrated in detail in FIG. 11 is secured to blocks 144, 146 via fastener holes 336. Extended end of latch arm 222 includes roller 230 which couples with a retracted detent slot 338 on latch block 228. Block 228 also includes a curved end surface defining a forward detent slot 340 as will be explained. In the retracted position shown in FIG. 10, latch arm 222 is biased via spring 232 (as illustrated in FIG. 4) into detent slot 338 to restrict movement or advancement of blocks 144, 146. To release block 144, 146 for advancement, latch arm 222 is rotated against the spring bias as illustrated by arrow 226 to move roller 230 out of detent slot 338. Rotation of latch arm 222 also rotates push arm 224 which engages curved surface 340 to push blocks 144, 146 toward assembly datums 330-1, 330-2. Blocks 144, 146 are further advanced by an operator to align with assembly datums 330-1, 330-2. Blocks are maintained in the advanced position via engagement of roller 230 of latch arm 222 biased in forward detent slot 340 via spring 232 until spacers 124 are secured to plates 120, 122 as illustrated with respect to block 146 in FIG. 10.

Figure 12:
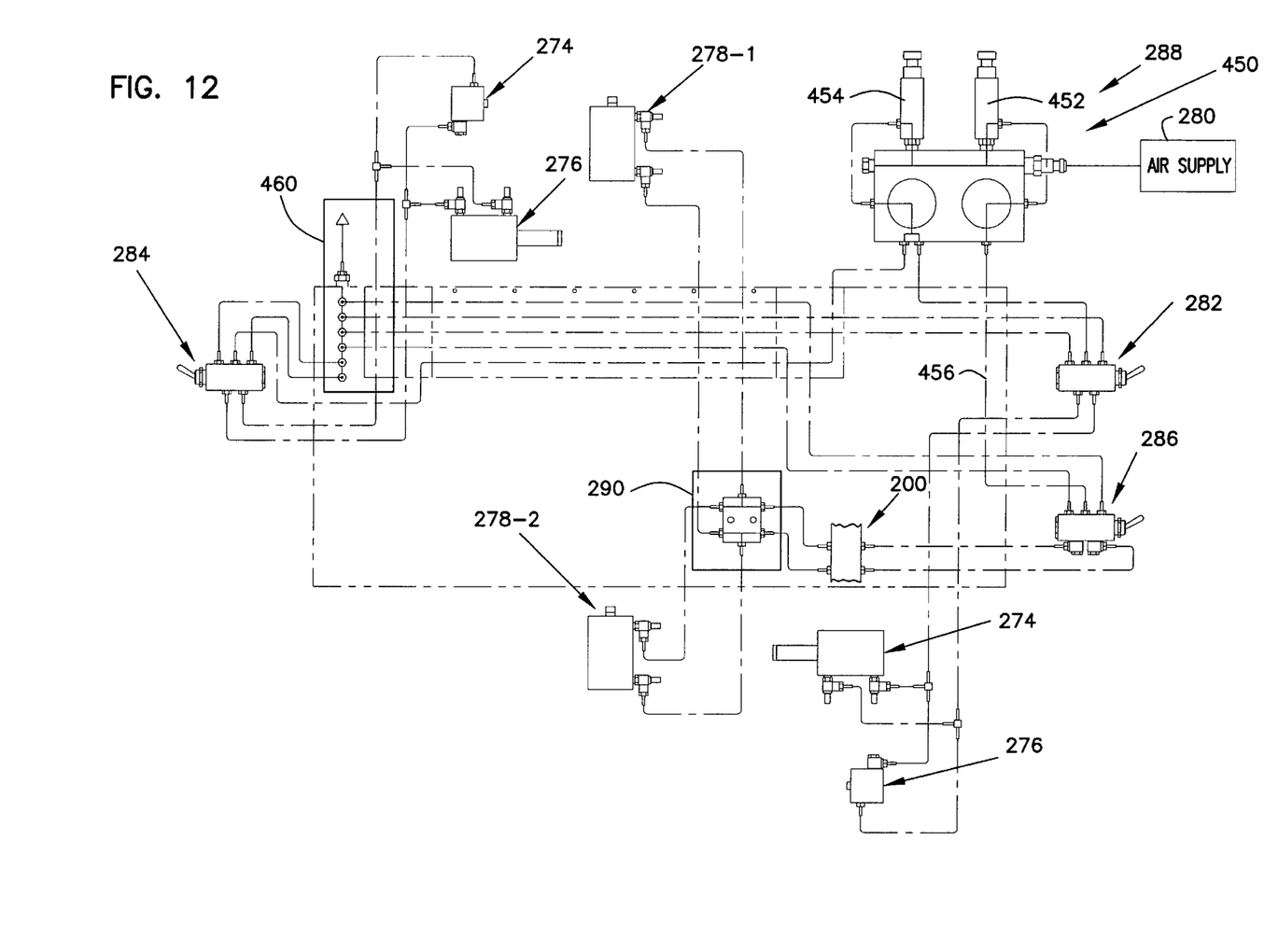
FIG. 12 is a schematic illustration of operation of an embodiment of a pneumatic system for operating components for assembly.

FIG. 12 is a schematic illustration of a pneumatic system for operating the clamps for assembling the plates 120, 122 and spacers 124 of the magnet assembly. As shown, pneumatic system 450 includes air supply 280 coupled to regulator 288 for distribution. Regulator includes pressure control valves 452 and 454 to control feed pressure to toggle valves 282, 284 and 286. Toggle valve 286 which controls operation of spacer clamps 170-1, 170-2 is coupled to regulator valve 454 via input line 456 and provides air pressure to spacer actuators 278-1 and 278-2 via manifold 290 for simultaneously supplying coordinated clamping pressure to clamps 170-1, 170-2. Air pressure is exhausted to exhaust 460. Thus, actuation of toggle valve 286 via an operator simultaneously operates clamps 170-1, 170-2 for multiple assembly spacers.

Toggle valves 282, 284 are coupled to pressure supply 280 to selectively supply air pressure to actuators 274, 276 for clamp assemblies 160, 162 for blocks 144, 146, respectively which is exhausted to exhaust 460. Toggle valves are coupled to regulator valve 454 for controlling air pressure. Actuation of toggle valves 282, 284 simultaneously operates retainer member and x-y axis alignment clamps for assembly blocks 144, 146. Thus, an operate operates toggle valve 282 for assembly block 144 and toggle valve 284 for assembly block 146 for simultaneous actuation of x-y alignment members and retainer member. Although a particular pneumatic system is shown, it should be understood that the invention is not limited to the exact embodiment shown.

Figure 13:
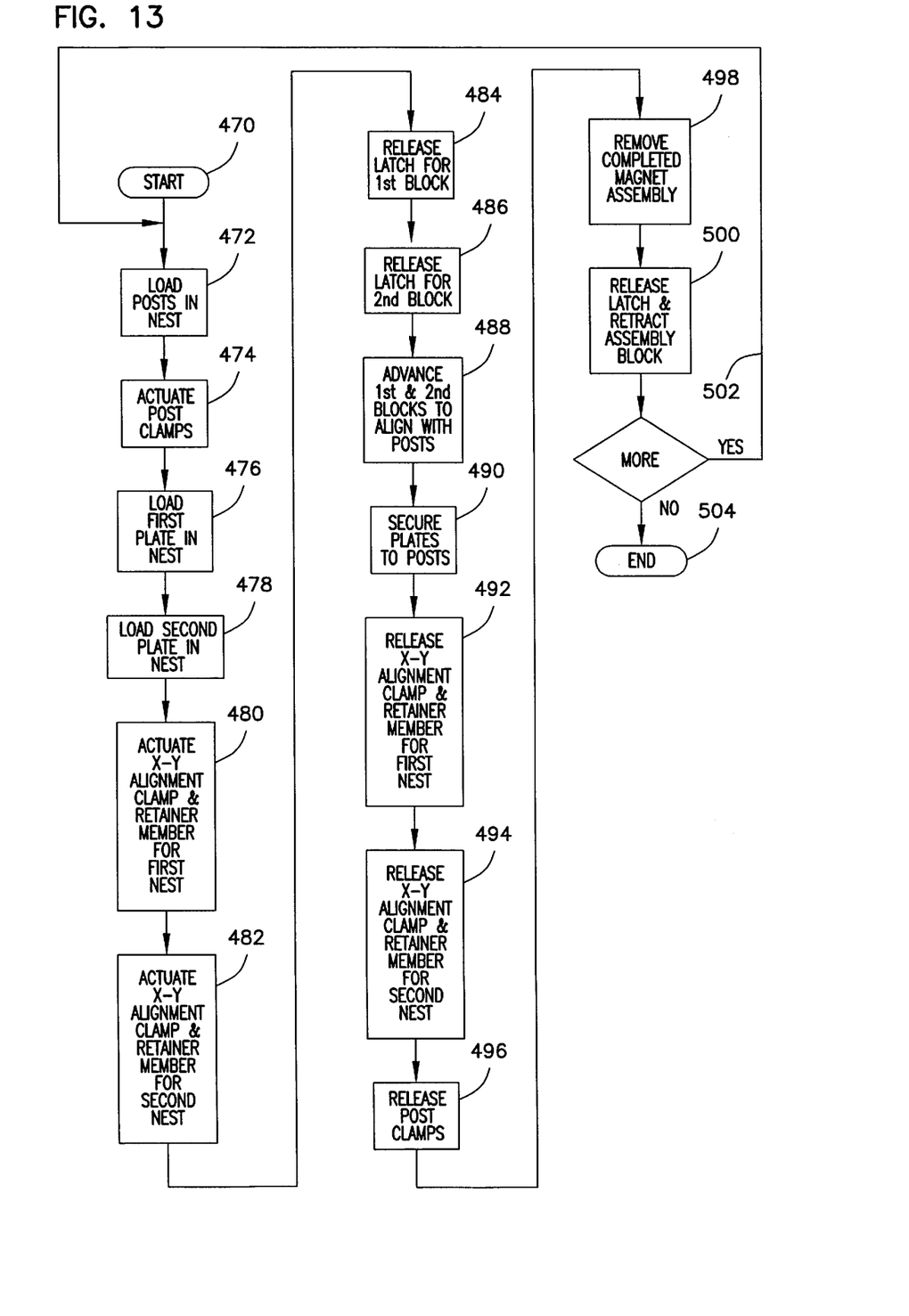
FIG. 13 is a flow chart of operation of the embodiment of the device illustrated in FIG. 3.

FIG. 13 is a flow chart illustrating operation of the embodiment of the invention illustrated for assembling a magnet assembly 118. Operation commences as illustrated by block 470 and spacers are loaded into spacer nests 148-1, 148-2 as illustrated by block 472. Spacers are secured in spacer nests 148-1, 148-2 by clamps 170-1, 170-2 as illustrated by block 474. Plates 120, 122 are loaded into nests of actuator blocks 144, 146 as illustrated by blocks 476, 478. The x-y alignment clamps and retainer member are actuated to align and retain plate 120 in a first nest as illustrated by block 480 and x-y alignment clamps and retainer member are actuated to align and retain plate 122 in a second nest as illustrated by block 482. During load operations latch arm 222 cooperates with detent slot 338 of latch block 228 to retain assembly blocks 144, 146 in a retracted position. Once the plates 120, 122 and spacers 124 are loaded for assembly, latch arm 222 is pivoted to release latch arm 222 from detent slot 338 as illustrated by blocks 484, 486.

Once latch arms 222 are released, blocks 144, 146 advanced to the assembly datums 330-1, 330-2 aligned with ends of spacers 124 supported in nests 148-1, 148-2 as illustrated by block 488. The plates 120, 122 are secured to spacers 124 as illustrated by block 490 to assembly the magnet assembly 118. Thereafter x-y alignment clamps and retainer member are released as illustrated by blocks 492, 494 and spacer clamps are released as illustrated by block 496. Thereafter, the completed magnet assembly is removed as illustrated by block 498.

For a next operation cycle, latch arm 222 is released from forward detent slot 340 and blocks 144, 146 are retracted until latch arm 222 aligns with retracted detent slot 338 as illustrated by block 500. Latch arm 222 engages detent slot 338 to maintain blocks 144, 146 in the retracted positions for load operations. Operation continues as illustrated by line 502 for continuous assembly of desired magnet assemblies. After desired magnet assemblies are assembled, operation ends as illustrated by block 504.

In the embodiment of the device shown, plates 120, 122 are supported in plate nests for assembly to spacers 124 supported in spacer nests 148-1, 148-2. Plate nests include a nest base coupled to an assembly block 144, 146 movably coupled relative to the spacer nests 148-1, 148-2 for selectively aligning the plates for assembly to spacers 124 in spacer nests 148-1, 148-2. As described, plates 120, 122 are aligned in nests via x-y datum members 158. The plates are biased toward x-y datum members via clamps operably coupled to the nest base and operable between a retracted position and a clamping position. Plates are retained in nest for assembly by retainer members operably coupled to the assembly blocks. In the embodiment shown, plates are retained via cooperation of magnet 256 and a movable retaining surface parallel to and spaced from the nest base. X-Y alignment clamps are biased toward plates and frictionally engage plates 120, 122 to restrict movement of plates 120, 122 from nests. As shown, plates 120, 122 are retained relative to nest base 156 by members operably coupled to nest base 156 which engage, but do not penetrate the plates to limit release of magnetic particles which may corrupt data stored in the disc drive.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matter of structure and arrangement of parts within the principles of the present invention to the full extent indicated by the broad general meaning of the terms in which the appended claimed are expressed. For example, the particular elements may vary depending on the particular application while maintaining substantially the same functionality without departing from the scope and spirit of the present invention. In addition, although the preferred embodiment described herein is directed to a magnetic disc drive system, it should be understood that the teaching of the present invention may be directed to other data storage systems, without departing from the scope and spirit of the present invention.

What is claimed is:

1. A method for assembling a magnet assembly comprising steps of:
    (a) providing spaced plate nests including a nest base having an x-y axis and x-y datum members, said plate nests being moveable along a track between a retracted position and an assembly position;
    (b) providing an x-axis clamp for biasing a plate relative to the x-axis datum member;
    (c) providing a y-axis clamp for biasing a plate relative to the y-axis datum member;
    (d) providing a retainer member operably coupled to the nest base and movable between a retracted position and a retaining position for retaining a plate relative to the nest base;
    (e) providing a spacer nest supported between plate nests;
    (f) loading plates in plates nest and aligning plates relative to the x-y datum members;
    (g) actuating the x-axis clamp for biasing the plate relative to the x-axis datum;
    (h) actuating the y-axis clamp for biasing the plate relative to the y-axis datum;
    (i) operating the retainer member from the retracted position to the retaining position to retain plates relative to nest base for assembly;
    (j) loading spacer in spacer nest;
    (k) clamping spacer in spacer nest to secure spacer for assembly; and position and the clamping position.
    (l) moving plate nests along the track to align plates relative to ends of spacers for assembly.

2. The method of claim 1 wherein the retainer member, x-axis clamp and y-axis clamp are simultaneously actuated to align and retain a plate relative to nest base for assembly.

3. The method of claim 1 further comprising a step of:
(m) providing a magnet on nest base for retaining a plate, said magnet biasing the plate toward the nest base to retain the plate relative to the nest base.

4. The method of claim 1 further comprising steps of:
(m) providing a latch assembly including a latch arm coupled to the base and a latch base coupled to the plate nest, said latch base including detent slots; and (n) maintaining the latch base in a first detent slot to maintain the plate nest in a retracted position for loading;
(o) releasing the latch arm from the first detent slot; and
(p) moving the plate nest to the assembly position and positioning the latch arm into the second detent slot to maintain the plate nest in the assembly position.

* * * * *

UNITED STATES PATENT AND TRADEMARK OFFICE
CERTIFICATE OF CORRECTION

PATENT NO. : 6,047,459
DATED : April 11, 2000
INVENTOR(S) : Fahley et al.

It is certified that error appears in the above-identified patent and that said Letters Patent is hereby corrected as shown below:

Title page,
Item [56], References Cited, OTHER PUBLICATIONS, delete "08/513,280" and insert -- 08/846,280 --.

Signed and Sealed this

Twenty-first Day of June, 2005

JON W. DUDAS
*Director of the United States Patent and Trademark Office*